United States Patent
Umayahara

(10) Patent No.: US 8,053,124 B2
(45) Date of Patent: Nov. 8, 2011

(54) FUEL CELL SYSTEM AND MOBILE BODY

(75) Inventor: Kenji Umayahara, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 759 days.

(21) Appl. No.: 12/085,640

(22) PCT Filed: Jul. 17, 2007

(86) PCT No.: PCT/JP2007/064390
§ 371 (c)(1),
(2), (4) Date: May 28, 2008

(87) PCT Pub. No.: WO2008/023521
PCT Pub. Date: Feb. 28, 2008

(65) Prior Publication Data
US 2009/0169937 A1 Jul. 2, 2009

(30) Foreign Application Priority Data
Aug. 22, 2006 (JP) ................. 2006-225663

(51) Int. Cl.
*H01M 8/04* (2006.01)
(52) U.S. Cl. ..................................... 429/432
(58) Field of Classification Search .............. 429/428, 429/430, 432
See application file for complete search history.

(56) References Cited

U.S. PATENT DOCUMENTS
7,438,146 B2 * 10/2008 Hirakata et al. .......... 180/65.31

FOREIGN PATENT DOCUMENTS

| JP | 2003-249236 A | 9/2003 |
|---|---|---|
| JP | 2003-303605 A | 10/2003 |
| JP | 2004-014160 A | 1/2004 |
| JP | 2004-56868 A | 2/2004 |
| JP | 2004-103317 A | 4/2004 |
| JP | 2004-172028 A | 6/2004 |
| JP | 2004-213961 A | 7/2004 |
| JP | 2005-26054 A | 1/2005 |
| JP | 2005-071797 A | 3/2005 |

* cited by examiner

*Primary Examiner* — Stephen J. Kalafut
(74) *Attorney, Agent, or Firm* — Kenyon & Kenyon LLP

(57) ABSTRACT

In a mobile body, an intermittent operation to temporarily halt a cell operation is performed at a time when a request for power generation with respect to a fuel cell stack is less than a predetermined value, and recovery processing of a cell voltage is performed at a time when a cell voltage recovery processing executing condition is satisfied during the intermittent operation. When the mobile body is moving, a threshold voltage Vth1 is set as the cell voltage recovery processing executing condition. When the mobile body is stopped, a threshold voltage Vth2 is set as the cell voltage recovery processing executing condition. When the voltages are set so as to obtain a relation Vth1>Vth2, the cell voltage recovery processing can be limited during the stop of the mobile body.

7 Claims, 3 Drawing Sheets

FUEL CELL SYSTEM AND MOBILE BODY

TECHNICAL FIELD

The present invention relates to a fuel cell system in which an intermittent operation for temporarily halting a cell operation is performed at a time when a request for power generation with respect to a fuel cell stack is less than a predetermined value, and a mobile body including this system.

BACKGROUND ART

A fuel cell system is an energy conversion system in which a fuel gas and an oxide gas are supplied to a film-electrode bonded member to cause an electrochemical reaction, and chemical energy is converted into electric energy. Above all, in a solid polymer electrolytic fuel cell in which a solid polymer film is used as an electrolyte, compactness can easily be achieved at low cost, further the cell has a high output density, and hence an application as a power supply system to be mounted on a vehicle is expected.

Furthermore, in a fuel cell vehicle on which the fuel cell system is mounted as a power source, in a high output area where power generation efficiency is high, a fuel cell stack is allowed to generate power, and the power is supplied to a traction motor from both or one of the fuel cell stack and a secondary cell, whereas in a low output area where the power generation efficiency is poor, the power generation of the fuel cell stack is temporarily halted, and operation control is performed so as to supply the power only from the secondary cell to the traction motor. An operation method in which the power generation of the fuel cell stack and the halting of the power generation are alternately repeated in accordance with a size of a load of the fuel cell stack in this manner is referred to as an intermittent operation. In a low load area where the power generation efficiency of the fuel cell stack is low, the intermittent operation to temporarily halt the operation of the fuel cell stack is performed, so that the fuel cell stack can be operated in a region in which energy conversion efficiency is high, and the efficiency of the whole fuel cell system can be improved.

From a viewpoint of a power generation characteristic of the fuel cell stack, even when control shifts from a power generation halted state to a power generation state, a considerably long time is required for the supply of the fuel gas and the oxide gas to the fuel cell stack, progress of the electrochemical reaction in the film-electrode bonded member, the generation of the power corresponding to a required power and the like. Therefore, the required power cannot instantly be output, and delay in the power generation is sometimes caused. In the vehicle on which the fuel cell system is mounted as the power source to be mounted on the vehicle, such delay in the power generation becomes a factor for deterioration of drivability.

To solve such a problem, in Japanese Patent Application Laid-Open No. 2004-172028, a method is suggested in which at a time when a cell voltage of the fuel cell stack which has performed the intermittent operation to thereby shift to the power generation halted state becomes below a predetermined value, an air compressor is driven to supply the oxide gas to the fuel cell stack, oxygen shortage in a cathode of the fuel cell stack is solved to recover the cell voltage, and response delay with respect to the request for the power generation is suppressed.

[Patent Document 1] Japanese Patent Application Laid-Open No. 2004-172028

DISCLOSURE OF THE INVENTION

However, even in a situation in which generation of load fluctuation is not expected as in a situation during stop of a vehicle (in a situation in which even if the load fluctuation occurs, response delay does not influence drivability), when processing of driving an air compressor or the like to supply an oxide gas to a fuel cell stack and recover a cell voltage is performed, an auxiliary machine power is uselessly consumed, and hence power generation efficiency is low.

On the other hand, in a situation in which the response delay with respect to a required power influences the drivability as in a situation during run of the vehicle, it is not preferable to leave decrease of the cell voltage as it is.

Therefore, a theme of the present invention lies in that both suppression of response delay and improvement of power generation efficiency in a fuel cell system are achieved.

To solve the above-mentioned problem, a mobile body according to the present invention includes a fuel cell system having a control device which performs an intermittent operation to temporarily halt a cell operation at a time when a request for power generation with respect to a fuel cell stack is less than a predetermined value and which performs recovery processing of a cell voltage at a time when a cell voltage recovery processing executing condition is satisfied during the intermittent operation. The control device limits the cell voltage recovery processing during stop of the mobile body.

During the stop of the mobile body, a required load is small, and hence there is a small necessity of recovering the cell voltage. During the stop of the mobile body, the cell voltage recovery processing is limited, so that decrease of power generation efficiency due to unnecessarily performed cell voltage recovery processing can effectively be suppressed. Here, "to limit the cell voltage recovery processing" is, for example, to set the cell voltage recovery processing executing condition in a limited manner. The fact that the cell voltage recovery processing executing condition is limited indicates that the cell voltage recovery processing executing condition is not easily satisfied.

It is to be noted that it may be constituted that when the mobile body is moving, the cell voltage recovery processing executing condition is leniently set. To leniently set the cell voltage recovery processing executing condition indicates that the cell voltage recovery processing executing condition is easily satisfied.

According to a preferable mode for carrying out the present invention, the cell voltage recovery processing executing condition during the stop of the mobile body is set in a limited manner as compared with that during the moving of the mobile body.

To solve the above-mentioned problem, a fuel cell system according to the present invention includes a control device which performs an intermittent operation to temporarily halt a cell operation at a time when a request for power generation with respect to a fuel cell stack is less than a predetermined value and which performs recovery processing of a cell voltage at a time when a cell voltage recovery processing executing condition is satisfied during the intermittent operation, and a power accumulation device which supplies a power to a power load. The control device limits the cell voltage recovery processing at a time when the power to be supplied from the power accumulation device exceeds a required load during the intermittent operation.

When the power to be supplied from the power accumulation device covers the required load even during the intermittent operation, the necessity of recovering the cell voltage is small, so that the cell voltage recovery processing can be limited to suppress the decrease of the power generation efficiency due to the unnecessarily performed cell voltage recovery processing.

As a remaining capacity of the power accumulation device increases, the cell voltage recovery processing executing condition may be set in a limited manner. When the remaining capacity of the power accumulation device is large, the power to be supplied from the power accumulation device can cover the required load even during the intermittent operation, and hence the necessity of recovering the cell voltage is small. When the remaining capacity of the power accumulation device is large, the cell voltage recovery processing can be limited to suppress the decrease of the power generation efficiency due to the unnecessarily performed cell voltage recovery processing.

It is to be noted that it may be constituted that as the required load with respect to the fuel cell stack during the intermittent operation decreases, the cell voltage recovery processing executing condition is set in a limited manner. Even during the intermittent operation, when the required load with respect to the fuel cell stack is small, the necessity of recovering the cell voltage is small. Therefore, the cell voltage recovery processing can be limited to suppress the decrease of the power generation efficiency due to the unnecessarily performed cell voltage recovery processing.

BEST MODE FOR CARRYING OUT THE INVENTION

Figure 1:
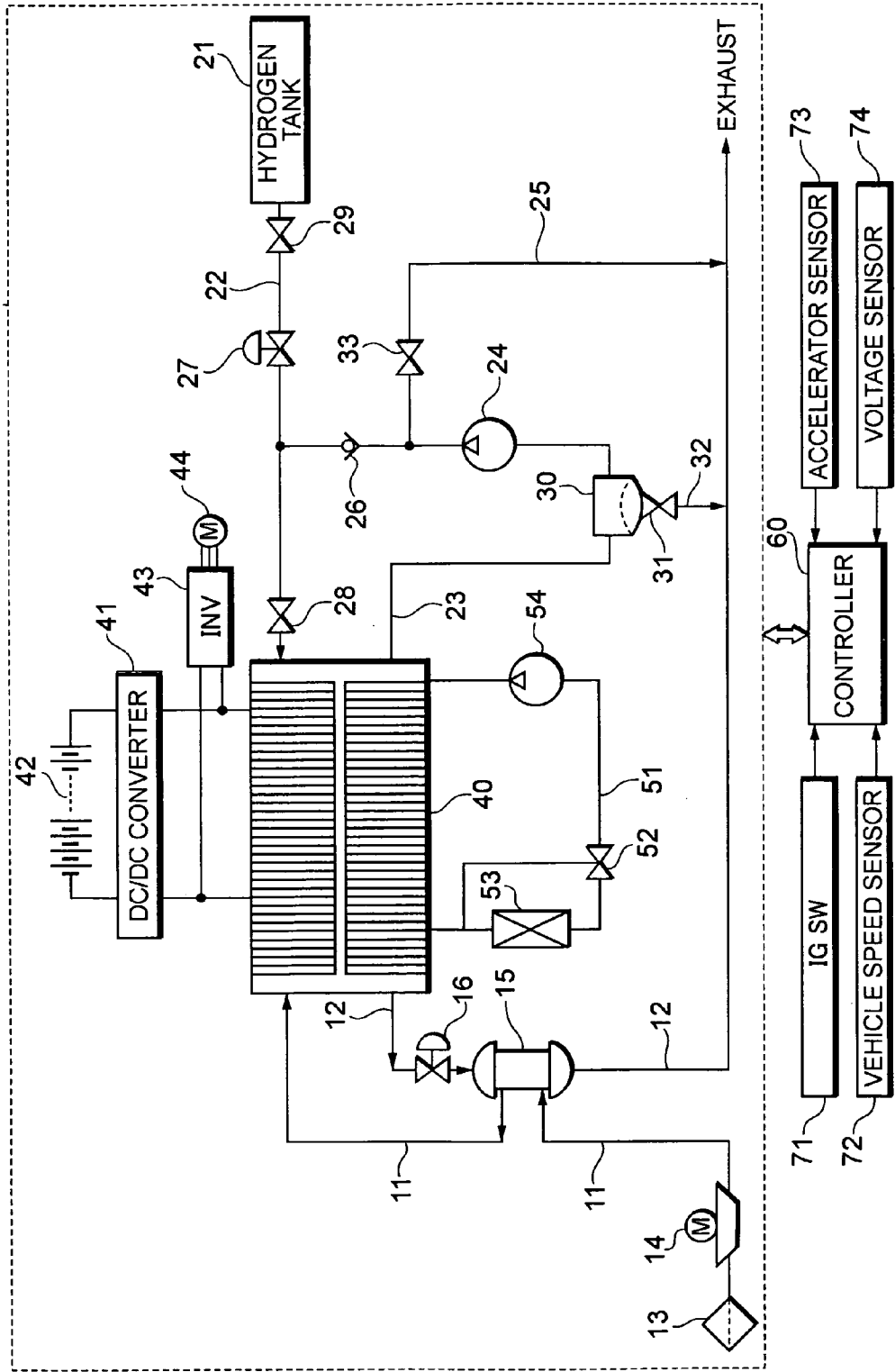
FIG. 1 is a system constitution diagram of a fuel cell system according to the present embodiment.

FIG. 1 is a system constitution of a fuel cell system 10 according to the present embodiment.

The fuel cell system 10 functions as a power generation system to be mounted on, for example, a fuel cell vehicle, and includes a solid polymer electrolytic fuel cell stack 40 including a stack structure in which a plurality of cells are laminated. Each cell includes a film-electrode bonded member in which an anode is arranged at one surface of an electrolytic film and in which a cathode is arranged at the other surface, and a separator provided with a gas channel (an anode gas channel, a cathode gas channel) for passing a reactive gas (a fuel gas, an oxide gas) through the film-electrode bonded member and a refrigerant channel for passing a refrigerant. The fuel cell stack 40 receives supply of a hydrogen gas (the fuel gas) at the anode, and receives an oxygen gas (the oxide gas) at the cathode to generate a power.

In the fuel cell stack 40, an oxidizing reaction of formula (1) occurs in the anode, and a reducing reaction of formula (2) occurs at the cathode. In the whole fuel cell stack 40, an electromotive reaction of formula (3) occurs.

(1);

(2); and

(3).

An oxygen gas supply system of the fuel cell system 10 is provided with an oxygen gas supply path 11 for supplying the oxygen gas to the fuel cell stack 40, and an oxygen off gas discharge path 12 for discharging an oxygen off gas discharged from the fuel cell stack 40 to the outside. The oxygen gas supply path 11 is provided with a filter 13 for removing powder dust and the like contained in the oxygen gas in the atmosphere, an air compressor 14 for pressurizing the oxygen gas, and a humidifier 15 for appropriately humidifying the oxygen gas pressurized by the air compressor 14.

The humidifier 15 exchanges water between a lowly wet oxygen gas (a dry gas) taken from the atmosphere and a highly wet oxygen off gas (a wet gas) discharged from the cathode of the fuel cell stack 40. As shown in the formula (2), the water is produced in the cathode, and hence the oxygen off gas discharged from the cathode contains a large amount of water. The oxygen gas humidified by the humidifier 15 is supplied to the fuel cell stack 40 via the oxygen gas supply path 11, and used for the power generation of the fuel cell stack 40. The oxygen off gas discharge path 12 is a pipe provided in a discharge system of the oxygen gas, and a pressure adjustment valve 16 for adjusting an oxygen gas pressure in the fuel cell stack 40 is disposed between the humidifier 15 and the fuel cell stack 40. The oxygen off gas flowing through the oxygen off gas discharge path 12 passes through the pressure adjustment valve 16 for use in the water exchange in the humidifier 15, and is then discharged as an exhaust gas from the system to the atmosphere.

A hydrogen gas supply system of the fuel cell system 10 is provided with a hydrogen tank 21 as a hydrogen supply source in which a high-pressure hydrogen gas is stored; a hydrogen gas supply path 22 which supplies, to the fuel cell stack 40, the hydrogen gas introduced in the hydrogen tank 21; a shutoff valve 29 which controls supply/stop of the hydrogen gas from the hydrogen tank 21 to the hydrogen gas supply path 22; a shutoff valve 28 which controls supply/stop of the hydrogen gas from the hydrogen gas supply path 22 to the fuel cell stack 40; a circulation path 23 for allowing a hydrogen off gas (an unreacted hydrogen gas) discharged from the fuel cell stack 40 to reflow to the hydrogen off gas discharge path 22; a hydrogen pump 24 which supplies under pressure the hydrogen off gas flowing through the circulation path 23 to the hydrogen gas supply path 22; and a discharge path 25 which is branched from the circulation path 23 to join the oxygen off gas discharge path 12. The hydrogen pump 24 is a scroll pump, a vane pump, a root type pump, a diaphragm pump or the like.

On an upstream side of the hydrogen off gas discharge path 22, a regulator 27 is interposed which regulates a pressure of a high-pressure hydrogen gas discharged from the hydrogen tank 21, and the circulation path 23 joins a downstream side of the regulator 27. The hydrogen gas flowing from the hydrogen tank 21 to the hydrogen gas supply path 22 and the hydrogen off gas reflowing through the circulation path 23 join a connection point between the hydrogen gas supply path 22 and the circulation path 23, and are supplied as a mixed gas to the fuel cell stack 40. On a downstream side of the hydrogen pump 24 of the circulation path 23, a check valve 26 is interposed which suppresses counter flow of the hydrogen off gas reflowing to the fuel cell stack 40.

On the upstream side of the hydrogen pump 24, a gas-liquid separator 30 is interposed which separates the water from the hydrogen off gas flowing through the circulation path 23. A fluid which flows through the circulation path 23 includes the hydrogen off gas discharged from the fuel cell stack 40 and produced water produced by an electrochemical reaction in the fuel cell stack 40. The gas-liquid separator 30 separates this produced water from the hydrogen off gas. The hydrogen off gas from which the water has been separated is forced to reflow to the fuel cell stack 40 by the hydrogen pump 24, whereas the water collected by the gas-liquid separator 30 is discharged from a fluid pipe 32 to the oxygen off gas discharge path 12 via a drain valve 31.

An upstream end of the fluid pipe 32 is connected to the drain valve 31 of the gas-liquid separator 30, and a downstream end thereof is connected to the oxygen off gas discharge path 12, whereby the water separated by the gas-liquid separator 30 is allowed to flow into the oxygen off gas discharge path 12. The discharge path 25 is provided with a purge valve 33 which functions as a shut valve for opening and closing this discharge path. The purge valve 33 is appropriately opened and closed, so that impurities included in the hydrogen off gas can be discharged together with the hydrogen off gas to the oxygen off gas discharge path 12 via the discharge path 25. The impurities included in the hydrogen off gas are discharged from the discharge path 25, whereby an impurity concentration in the hydrogen off gas is lowered, and a hydrogen concentration in the hydrogen off gas circulated and supplied to the fuel cell stack 40 can be increased.

A power system of the fuel cell system 10 is provided with a secondary cell (a power accumulation device) 42 for accumulating the generated power of the fuel cell stack 40 and regenerative energy during braking of the vehicle; a DC/DC converter 41 which adjusts an output voltage of the fuel cell stack 40 to control distribution of power supply between the fuel cell stack 40 and the secondary cell 42; and an inverter 43 which converts, into an alternating-current power, a direct-current power supplied from the fuel cell stack 40 or the secondary cell 42 to supply the power to a traction motor (a vehicle run motor) 44.

A cooling system of the fuel cell system 10 is provided with a refrigerant channel 51 for passing a refrigerant circulated through the fuel cell stack 40; a refrigerant pump 54 which supplies the refrigerant under pressure along the refrigerant channel 51; a radiator 53 for cooling the refrigerant; and a bypass valve 52 which allows the refrigerant to bypass the radiator 53, thereby passing the refrigerant along the refrigerant channel 51. A bypass amount of the refrigerant which bypasses the radiator 53 can be adjusted to adjust a refrigerant temperature.

A control system of the fuel cell system 10 is provided with a controller 60 for controlling the whole fuel cell system 10. The controller 60 is a control unit (ECU) including a central processing unit (CPU), storage devices (ROM, RAM), an input/output interface and the like.

For example, on receiving a startup signal output from an ignition switch 71, the controller 60 starts an operation of the fuel cell system 10, and obtains a required power of the whole system based on an accelerator open degree signal output from an accelerator sensor 73, a vehicle speed signal output from a vehicle speed sensor 72 and the like. The required power of the whole system is a total value of a vehicle run power and an auxiliary machine power. Examples of the auxiliary machine power include a power consumed in vehicle-mounted auxiliary machines (a humidifier, an air compressor, a hydrogen pump, a cooling water circulation pump, etc.), a power consumed in a device (a change gear, a wheel control device, a steering device, a suspension device, etc.) required for the run of the vehicle, and a power consumed in a device (an air conditioning device, a lighting equipment, an audio, etc.) disposed in a passenger space.

Moreover, the controller 60 determines distribution of the output powers of the fuel cell stack 40 and the secondary cell 42, adjusts a rotation number of the air compressor 14 and a valve open degree of the regulator 27, adjusts an amount of the reactive gas to be supplied to the fuel cell stack 40, and controls the DC/DC converter 41 to adjust the output voltage of the fuel cell stack 40 so that an amount of the power to be generated by the fuel cell stack 40 matches a target power, whereby an operation point (the output voltage, an output current) of the fuel cell stack 40 is controlled. Furthermore, so as to obtain the target vehicle speed corresponding to the accelerator open degree, the controller 60 outputs, for example, alternating-current voltage command values of a U-phase, a V-phase and a W-phase as a switching command to the inverter 43, and controls an output torque and a rotation number of the traction motor 44.

When the required power is a predetermined value or less, the controller 60 performs an intermittent operation to temporarily halt the power generation. The predetermined value is an upper limit value of a power generation region in which the power generation efficiency of the fuel cell stack 40 decreases. In this power generation region, a large part of power generation energy is consumed by the auxiliary machines, and hence the power generation efficiency decreases. During the intermittent operation, a power generation state of the fuel cell stack 40 becomes a temporarily halted state, but the auxiliary machines are ready for the operation, and the power to be supplied from the secondary cell 42 covers the required power (the sum of the vehicle run power and the auxiliary machine power) of the whole system. During the halt of the power generation, the controller 60 closes the shutoff valve 28, stops driving the air compressor 14, and temporarily halts the supply of the reactive gas to the fuel cell stack 40. Furthermore, the controller 60 operates the DC/DC converter 41 to raise the output voltage of the secondary cell 42, whereby an output terminal voltage of the fuel cell stack 40 is maintained at an open end voltage (OCV), and control is performed so that any current does not flow out of the fuel cell stack 40 during the intermittent operation.

The controller 60 monitors a cell voltage of the fuel cell stack 40 output from a voltage sensor 74, and performs cell voltage recovery processing in a stage in which the decrease of the cell voltage during the intermittent operation becomes below a predetermined threshold value. The cell voltage recovery processing refers to processing for recovering the cell voltage which has decreased owing to the halt of the supply of the reactive gas to the vicinity of the voltage before the decrease. Specifically, it refers to the processing in which the air compressor 14 is driven to supply the oxide gas to the cathode of the fuel cell stack 40, or the shutoff valve 28 is opened, and the hydrogen pump 14 is driven to supply the fuel gas to the anode of the fuel cell stack 40. Furthermore, in addition to this processing, processing of driving the refrigerant pump 54 to circulate the refrigerant through the fuel cell stack 40 may be included.

In the fuel cell stack 40, a part of hydrogen passes through the electrolytic film to move from the anode to the cathode. As a result, the electrochemical reaction occurs on a cathode side, and the oxygen gas remaining in the oxygen gas supply path 11 is consumed. Especially, the oxygen gas is present as much as only about 20 percentages in air, and hence the gas runs short earlier than the hydrogen gas. As one example of the cell voltage recovery processing, when the air compressor 14 is driven to replenish the cathode of the fuel cell stack 40 with the oxygen gas, the cell voltage can be recovered.

In addition, as described above, the necessity of recovering the cell voltage differs with the run of the vehicle and the stop of the vehicle. In a case where the vehicle is running, the decrease of the cell voltage during the intermittent operation becomes a factor for power generation delay, and hence drivability is influenced. On the other hand, in a case where the vehicle is stopped, the decrease of the cell voltage during the intermittent operation has an only little influence on the drivability. Therefore, a cell voltage recovery processing executing condition during the stop of the vehicle is set in a limited manner as compared with that during the run of the vehicle, so that the power generation efficiency can be improved while suppressing response delay of the fuel cell stack 40 with respect to a required load.

Here, the cell voltage recovery processing executing condition is a necessary condition to be satisfied in order to execute the cell voltage recovery processing. Examples of the condition include a condition that the cell voltage is below a certain value and a condition that a pressure or a concentration of the reactive gas (the fuel gas or the oxide gas) of the fuel cell stack 40 is below a certain value. Specifically, assuming that the cell voltage recovery processing executing condition during the run of the vehicle is a threshold voltage Vth1 and that the cell voltage recovery processing executing condition during the stop of the vehicle is a threshold voltage Vth2, Vth1>Vth2. Alternatively, for example, assuming that the cell voltage recovery processing executing condition during the run of the vehicle is a reactive gas pressure P1 and that the cell voltage recovery processing executing condition during the stop of the vehicle is a reactive gas pressure P2, P1>P2.

The fact that the cell voltage recovery processing executing condition is limited indicates that the cell voltage recovery processing executing condition is not easily satisfied. According to the above-mentioned example, the threshold voltage Vth2 indicates that the cell voltage recovery processing executing condition is limited as compared with the threshold voltage Vth1, and the reactive gas pressure P2 indicates that the cell voltage recovery processing executing condition is limited as compared with the reactive gas pressure P1.

Next, details of the cell voltage recovery processing will be described.

Figure 2:
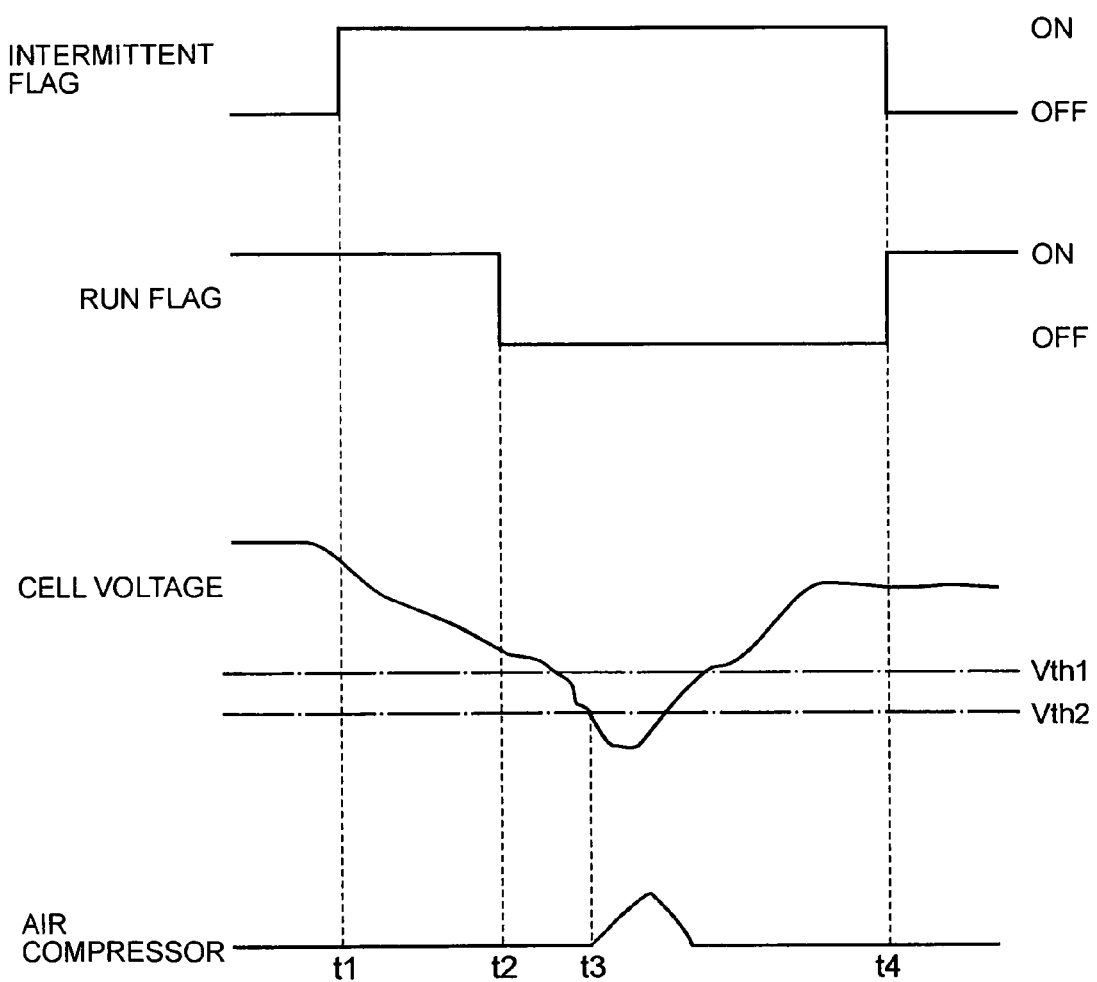
FIG. 2 is a time chart showing cell voltage recovery processing.

FIG. 2 shows a time chart of the cell voltage recovery processing. In the drawing, an "intermittent flag" is flag information indicating whether or not the intermittent operation is performed. The intermittent flag=ON indicates that the intermittent operation is being performed (the power generation is halted). The intermittent flag=OFF indicates that the intermittent operation is not performed (the cell is operating). For example, when the required power with respect to the fuel cell system 10 is a predetermined value or less, the intermittent flag=ON. When the required power with respect to the fuel cell system 10 exceeds the predetermined value, the intermittent flag=OFF. On the other hand, a "run flag" is flag information indicating whether or not the vehicle runs. The run flag=ON indicates that the vehicle is running. The run flag=OFF indicates that the vehicle is stopped. For example, when the vehicle speed detected by the accelerator sensor 73 is a predetermined value (e.g., several kms/h or less) or less, the run flag=OFF. When the vehicle speed detected by the accelerator sensor 73 exceeds the predetermined value, the run flag=ON.

For a period of time t1 to time t2, the intermittent flag is ON, the run flag is ON, and hence the intermittent operation is performed in a state in which the vehicle is running. The cell voltage recovery processing executing condition for this period is a "condition that the cell voltage is below the threshold voltage Vth1". However, as shown in the drawing, for the period of the time t1 to the time t2, the cell voltage is not below the threshold voltage Vth1, and hence any cell voltage recovery processing is not executed.

For a period of the time t2 to time t4, the intermittent flag is ON, the run flag is OFF, and hence the intermittent operation is performed in a state in which the vehicle is stopped. The cell voltage recovery processing executing condition for this period is a "condition that the cell voltage is below the threshold voltage Vth2". As shown in the drawing, at the time t3, the cell voltage is below the threshold voltage Vth2, and hence the air compressor 14 is driven (the cell voltage recovery processing is performed).

Figure 3:
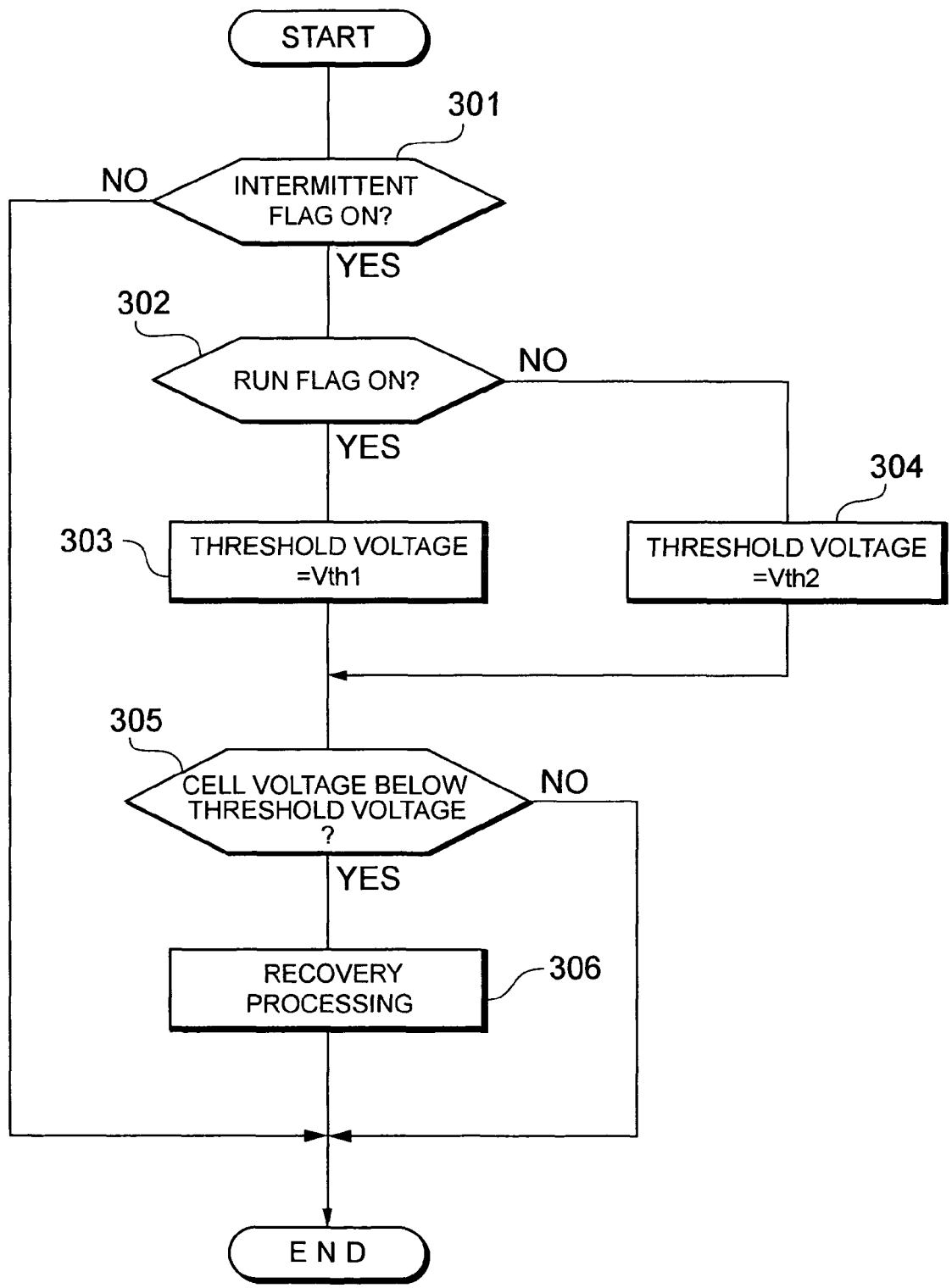
FIG. 3 is a flow chart showing a cell voltage recovery processing routine.

FIG. 3 is a flow chart showing a cell voltage recovery processing routine.

The voltage recovery processing routine is periodically executed repeatedly at constant intervals. When the voltage recovery processing routine is called, the controller 60 judges whether or not the intermittent flag is set to ON (step 301). When the intermittent flag is not set to ON (step 301; NO), the controller 60 comes out of the cell voltage recovery processing routine.

On the other hand, when the intermittent flag is set to ON (step 301; YES), the controller 60 judges whether or not the run flag is set to ON (step 302). When the run flag is set to ON (step 302; YES), the controller 60 sets the threshold voltage Vth1 as the cell voltage recovery processing executing condition (step 303). When the run flag is not set to ON (step 302; NO), the controller 60 sets the threshold voltage Vth2 as the cell voltage recovery processing executing condition (step 304).

Then, the controller 60 judges whether or not the cell voltage is below the threshold voltage (step 305). When the cell voltage is below the threshold voltage (step 305; YES), the controller 60 drives the air compressor 14 or the like to perform the cell voltage recovery processing (step 306). When the cell voltage is not below the threshold voltage (step 305; NO), the controller 60 comes out of the cell voltage recovery processing routine.

When the fuel cell vehicle is stopped, the required load is small, and hence the necessity of recovering the cell voltage is small. When the fuel cell vehicle is stopped, the cell voltage recovery processing is limited, so that the decrease of the power generation efficiency due to the unnecessarily performed cell voltage recovery processing can effectively be suppressed. That is, the cell voltage recovery processing executing condition during the stop of the fuel cell vehicle may be set in the limited manner as compared with that during the run of the fuel cell vehicle.

It is to be noted that in the present embodiment, when the power to be supplied from the secondary cell 42 exceeds the required load during the intermittent operation, the cell voltage recovery processing may be limited. Even during the intermittent operation, when the power to be supplied from the secondary cell 42 can cover the required load, the necessity of recovering the cell voltage is small, and hence the cell voltage recovery processing is limited, so that the decrease of the power generation efficiency due to the unnecessarily performed cell voltage recovery processing can be suppressed.

Moreover, as the remaining capacity of the secondary cell 42 increases, the cell voltage recovery processing executing condition may be set in the limited manner. When the remaining capacity of the secondary cell 42 is large, the power to be supplied from the secondary cell 42 can cover the required load even during the intermittent operation, and hence the necessity of recovering the cell voltage is small. When the remaining capacity of the secondary cell 42 is large, the cell voltage recovery processing is limited, so that the decrease of the power generation efficiency due to the unnecessarily performed cell voltage recovery processing can be suppressed.

It is to be noted that it may be constituted that as the required load with respect to the fuel cell stack 40 during the intermittent operation decreases, the cell voltage recovery processing executing condition is set in the limited manner. Even during the intermittent operation, when the required load with respect to the fuel cell stack 40 is small, the necessity of recovering the cell voltage is small, and hence the cell voltage recovery processing is limited, so that the decrease of the power generation efficiency due to the unnecessarily performed cell voltage recovery processing can be suppressed.

In the present embodiment, a use configuration in which the fuel cell system 10 is used as the power supply system to be mounted on the vehicle has been illustrated, but the use configuration of the fuel cell system 10 is not limited to this example, and the system may be used as a power supply system to be mounted on a mobile body (a ship, an airplane, a robot or the like). The fuel cell system 10 may be incorporated into a stationary cogeneration (heat and electricity are supplied together) system. The cogeneration system may either be commercial or household.

INDUSTRIAL APPLICABILITY

According to the present invention, both of suppression of response delay and improvement of power generation efficiency in a fuel cell system can be achieved.

The invention claimed is:

1. A mobile body, comprising:
a fuel cell system having a fuel cell stack having stacked cells and a control device, the control device performing an intermittent operation to temporarily halt operation of the fuel cell stack at a time when a request for power generation with respect to the fuel cell stack is less than a predetermined value, the control device performing recovery processing of a voltage of a cell at a time when a cell voltage recovery processing executing condition is satisfied during the intermittent operation,
wherein the control device is configured to limit the cell voltage recovery processing during a stop of the mobile body.

2. The mobile body according to claim 1, wherein the cell voltage recovery processing executing condition during the stop of the mobile body is set in a limited manner as compared with that during moving of the mobile body.

3. The mobile body according to claim 1, further comprising a power accumulation device, wherein the control device is configured to supply a power from the power accumulation device to a power load during the intermittent operation.

4. The mobile body according to claim 1, wherein the cell voltage recovery processing is to supply a reactive gas to the fuel cell stack during the intermittent operation.

5. A fuel cell system, comprising:
a fuel cell stack having stacked cells;
a control device performing an intermittent operation to temporarily halt operation of the fuel cell stack at a time when a request for power generation with respect to the fuel cell stack is less than a predetermined value, the control device performing recovery processing of a voltage of a cell at a time when a cell voltage recovery processing executing condition is satisfied during the intermittent operation; and
a power accumulation device supplying a power to a power load,
wherein the control device is configured to limit the cell voltage recovery processing at a time when the power to be supplied from the power accumulation device exceeds a required load during the intermittent operation.

6. The fuel cell system according to claim 5, wherein as a remaining capacity of the power accumulation device increases, the cell voltage recovery processing executing condition is set in a limited manner.

7. A fuel cell system, comprising:
a fuel cell stack having stacked cells; and
a control device performing an intermittent operation to temporarily halt operation of the fuel cell stack at a time when a request for power generation with respect to the fuel cell stack is less than a predetermined value, the control device performing recovery processing of a voltage of a cell at a time when a cell voltage recovery processing executing condition is satisfied during the intermittent operation,
wherein the cell voltage recovery processing executing condition is set in a limited manner, as a required load with respect to the fuel cell stack during the intermittent operation decreases.

* * * * *